(12) United States Patent
Miyazawa et al.

(10) Patent No.: US 8,325,369 B2
(45) Date of Patent: Dec. 4, 2012

(54) IMAGE SCANNING SYSTEM, IMAGE SCANNER, AND COMPUTER READABLE MEDIUM FOR IMAGE PROCESSING DEVICE

(75) Inventors: Masafumi Miyazawa, Aichi (JP); Takeshi Nagasaki, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 549 days.

(21) Appl. No.: 12/565,399

(22) Filed: Sep. 23, 2009

(65) Prior Publication Data

US 2010/0079823 A1   Apr. 1, 2010

(30) Foreign Application Priority Data

Sep. 26, 2008 (JP) ................................. 2008-248591
Sep. 26, 2008 (JP) ................................. 2008-248592

(51) Int. Cl.
*G06F 3/12* (2006.01)
(52) U.S. Cl. ....... 358/1.15; 358/448; 358/401; 358/474; 726/27; 726/4
(58) Field of Classification Search ................. 358/1.15, 358/401, 448, 474; 726/4, 27, 17, 21
See application file for complete search history.

(56) References Cited

U.S. PATENT DOCUMENTS

| | | | |
|---|---|---|---|
| 7,016,071 B1 * | 3/2006 | Hiraishi et al. ................. | 358/1.6 |
| 8,056,140 B2 * | 11/2011 | Fukuta ............................ | 726/26 |
| 8,169,639 B2 * | 5/2012 | Aoki et al. ..................... | 358/1.15 |
| 8,174,713 B2 * | 5/2012 | Yanagi et al. ................. | 358/1.15 |
| 8,176,548 B2 * | 5/2012 | Wu et al. ........................ | 726/20 |
| 8,205,267 B2 * | 6/2012 | Okamoto et al. ................ | 726/27 |
| 2005/0141026 A1 | 6/2005 | Fujino | |
| 2006/0061799 A1 * | 3/2006 | Okamoto et al. ............ | 358/1.14 |
| 2006/0177255 A1 * | 8/2006 | Mizoi ............................. | 400/62 |
| 2006/0195802 A1 | 8/2006 | Nakayama | |
| 2007/0239845 A1 | 10/2007 | Sueshige | |
| 2007/0245156 A1 | 10/2007 | Minamizawa | |

(Continued)

FOREIGN PATENT DOCUMENTS

JP         5153414 A     6/1993

(Continued)

OTHER PUBLICATIONS

Notification of Reasons for Rejection for Japanese Application No. 2008-248591 mailed Aug. 17, 2010.

(Continued)

*Primary Examiner* — Negussie Worku
(74) *Attorney, Agent, or Firm* — Banner & Witcoff, Ltd.

(57) ABSTRACT

An image scanning system comprises an image scanner and an information processing device. The image scanner comprises an output unit to output image data generated based on scanned image to the information processing device; and an instructing unit to transmit a prohibition command for prohibiting displaying of an image based on the image data, to the information processing device. The information processing device comprises a data reception unit to receive the image data outputted by the image scanner; a display unit; a control unit configured to control the display unit to display the image based on the image data; and a command reception unit configured to receive the prohibition command. In this configuration, the control unit operates to prohibit displaying of the image based on the received image data in response to reception of the prohibition command through the command reception unit.

16 Claims, 11 Drawing Sheets

U.S. PATENT DOCUMENTS

2008/0266467 A1 * 10/2008 Okamoto et al. ............. 348/739

FOREIGN PATENT DOCUMENTS

| JP | 2002366408 A | 12/2002 |
| JP | 2004038609 A | 2/2004 |
| JP | 2005-192022 | 7/2005 |
| JP | 2006215923 A | 8/2006 |
| JP | 2007-081717 | 3/2007 |
| JP | 2007272608 A | 10/2007 |
| JP | 2007282052 A | 10/2007 |

OTHER PUBLICATIONS

Notification of Reasons for Rejection for Japanese Application No. 2008-248592 mailed Aug. 17, 2010.

* cited by examiner

MESSAGE VIA LAN
PUSH-SCAN PREPARATION COMMAND MESSAGE VIA LAN
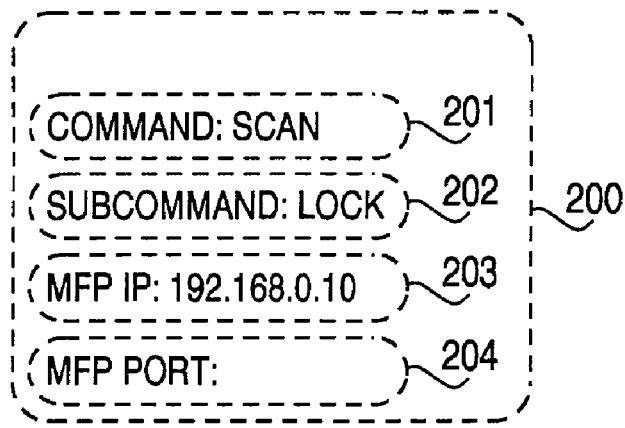
LOCK SUCCESS NOTIFICATION MESSAGE
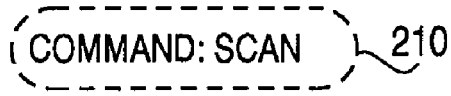
PUSH-SCAN PREPARATION COMMAND MESSAGE VIA USB
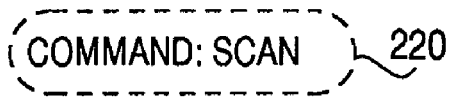
FIG. 5

IMAGE SCANNING SYSTEM, IMAGE
SCANNER, AND COMPUTER READABLE
MEDIUM FOR IMAGE PROCESSING DEVICE

CROSS-REFERENCE TO RELATED
APPLICATION

This application claims priority under 35 U.S.C. §119 from Japanese Patent Applications No. 2008-248591, filed on Sep. 26, 2008 and No. 2008-248592, filed on Sep. 26, 2008. The entire subject matter of the applications is incorporated herein by reference.

BACKGROUND

1. Technical Field

Aspects of the present invention relate to an image scanning system in which an image is scanned from a document, image data is generated from the scanned image, and an image based on the image data is displayed.

2. Related Art

Image scanning systems in which scanned image data is transmitted and received between a PC (Personal Computer) and an MFP (Multifunction Peripheral) via a LAN have been widely used. In such an image scanning system, a so-called push-scan function, where a user directly inputs a scan command to the MFP, and the scanned data generated by the MFP is transmitted to the PC via the LAN, is used.

SUMMARY

When the push-scan is performed, a user needs to place a document to be scanned on the MFP and to operate the MFP to input a start command for the push-scan. Therefore, in this case, the user is not at the place around the PC which receives the scanned image data. However, in the conventional image scanning system, the PC which has received a push-scan preparation command from the MFP automatically starts an application to wait for the scanned image data generated on the MFP. When the PC receives the scanned image data, the PC displays a scanned image through the application regardless of whether the user is at the place around the user's PC.

Therefore, a possibility that an outsider might sneak a look at the displayed image on a display of the PC arises. As a result, important information may leak to the outsider.

Aspects of the present invention are advantageous in that at least one of an image scanning system, an image scanner, an information processing device and a computer readable medium configured to prevent a displayed image obtained by a push-scan function from being looked by an outsider and thereby to prevent information from being leaked to the outsider is provided.

According to an aspect of the invention, there is provided an image scanning system, comprising: an image scanner that scans an image in accordance with a command directly inputted by a user and generates image data based on the scanned image; and an information processing device that displays an image corresponding to the image data generated by the image scanner. The image scanner comprises: an output unit configured to output the image data generated based on the scanned image to the information processing device; and an instructing unit configured to transmit a prohibition command for prohibiting displaying of an image based on the image data outputted by the output unit, to the information processing device. The information processing device comprises: a data reception unit configured to receive the image data outputted by the image scanner; a display unit configured to display various types of images; a control unit configured to control the display unit to display the image based on the image data received by the data reception unit; and a command reception unit configured to receive the prohibition command. In this configuration, the control unit operates to prohibit displaying of the image based on the image data received by the data reception unit in response to reception of the prohibition command through the command reception unit.

According to another aspect of the invention, there is provided an image scanner, comprising: a scanning unit configured to scan an image in accordance with a command directly inputted by a user and to generate image data based on the scanned image; an output unit configured to output the image data generated based on the scanned image to an information processing device; and an instructing unit configured to transmit a prohibition command for prohibiting displaying of an image based on the image data outputted by the output unit, to the information processing device.

According to another aspect of the invention, there is provided a computer readable medium having computer readable instruction stored thereon, which, when executed by a processor of an information processing device that displays an image corresponding to image data generated by an image scanner, configures the processor to perform the steps of: judging whether displaying of an image based on the image data generated by the image scanner is prohibited; receiving the image data from the image scanner; displaying the image based on the image data received by the receiving step; and prohibiting displaying of the image based on the image data received by the receiving step when it is judged in the judging step that displaying of the image based on the image data generated by the image scanner is prohibited.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE
ACCOMPANYING DRAWINGS

FIG. 5 illustrates examples of messages exchanged between the MFP and PC.

DETAILED DESCRIPTION

Hereafter, embodiments according to the invention will be described with reference to the accompanying drawings.

First Embodiment

Figure 1:
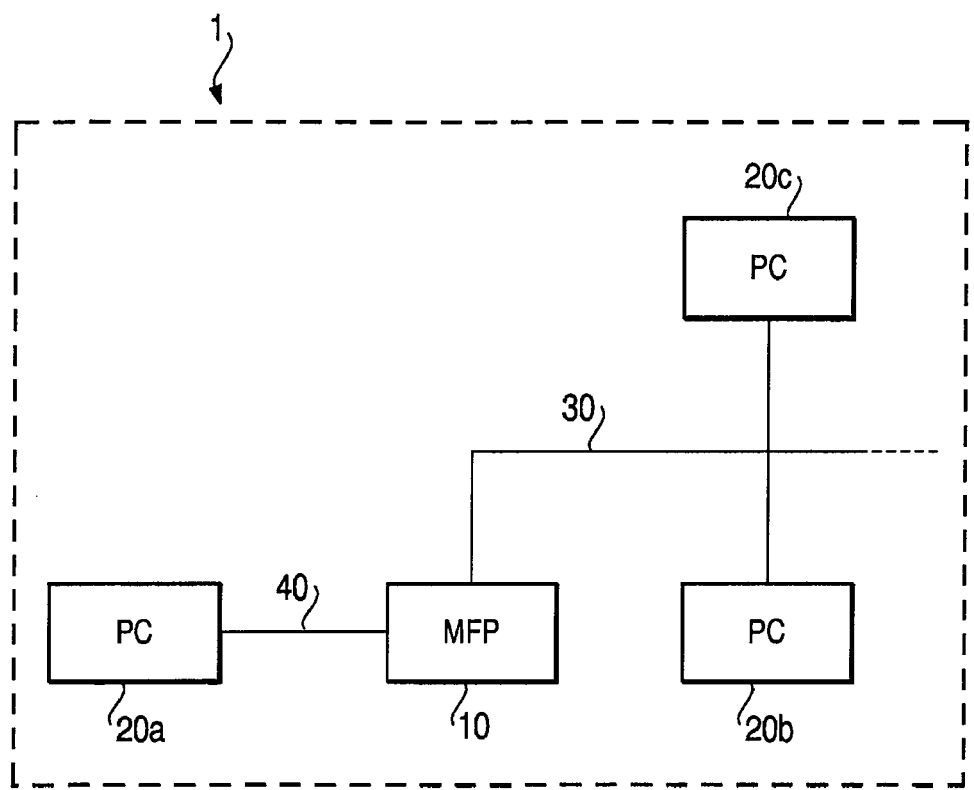
FIG. 1 is a block diagram illustrating a configuration of an image scanning system according to a first embodiment.

As shown in FIG. 1, an image scanning system 1 according to a first embodiment includes an MFP 10 having multiple functions of a printer, a scanner, a copying device and a facsimile device, and personal computers PC20a, PC20b and PC20c. The MFP 10 and the PC20a are connected to each other via a USB 40. The MFP 10, the PC 20b and PC 20c are connected to each other via a LAN 30.

It should be understood that although one MFP is illustrated in FIG. 1, more than one MFP may be provided in the image scanning system 1. It should also be understood that although three PCs are provided in the image scanning system 1, the number of PCs in the image scanning system 1 may be smaller than equal to two, and alternatively more than three PCs may be provided in the image scanning system 1. Since the PCs 20a, 20b and 20c have substantially the same configuration, in the following, frequently the PCs 20a, 20b and 20c are collectively referred to as PCs 20.

Figure 2A:
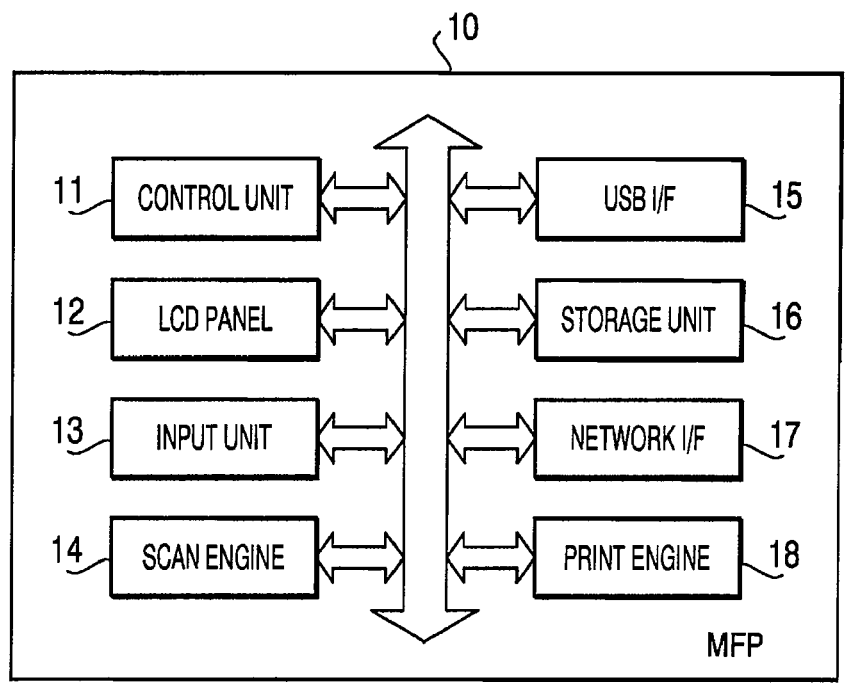
FIG. 2A is a block diagram illustrating a configuration of an MFP.

As shown in FIG. 2A, the MFP 10 includes a control unit 11, an LCD (Liquid Crystal Panel) 12, an input unit 13, a scan engine 14, an USB interface (I/F) 15, a storage unit 16, a network interface (I/F) 17 and a print engine 18. These components are connected to each other via a bus.

The control unit 11 is implemented by a microcomputer chip in which a CPU, a ROM, a RAM and I/O units are embedded, and performs centralized control for the components in the MFP 10 based on programs stored in the ROM.

The LCD panel 12 displays various types of information to be notified to users. The input unit 13 receives a user operation. More specifically, the input unit 13 includes, for example, mechanical switches or a touch panel.

Based on instructions from the control unit 11, the scan engine 14 scans an image from a document placed on a predetermined document scan position, and generates scanned image data corresponding to the scanned image.

The USB interface 15 performs communication with USB devices (e.g., the PC 20a in this embodiment) based on a USB standard. The storage unit 16 is a non-volatile memory (e.g., a hard disk drive or a flash memory), and stores various types of data to achieve the various types of functions of the MFP 10.

The network interface 17 performs communication with devices on the LAN 30 (e.g., the PCs 20b and 20c) based on the Ethernet standard.

Based on instructions from the control unit 11, the print engine 18 prints an image on a print medium such as a sheet of paper. For example, an image scanned by the scan engine 18, an image received through the facsimile function, or an image received from the external devices (e.g., the PC 20) is printed by the print engine 18.

Figure 2B:
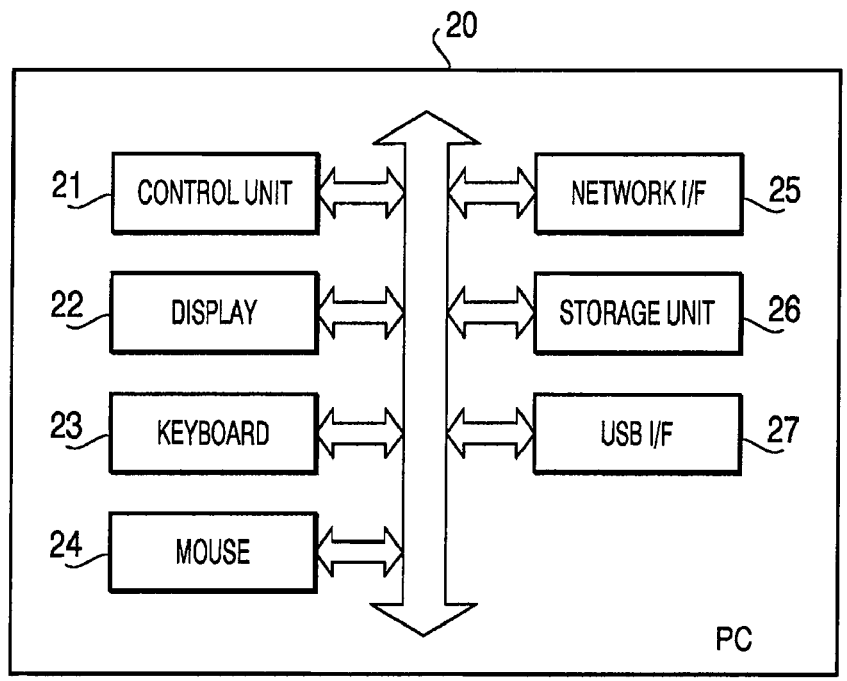
FIG. 2B is a block diagram illustrating a configuration of a PC.

As shown in FIG. 2B, the PC 20 includes a control unit 21, a display 22, a keyboard 23, a mouse 24, a network interface 25, a storage unit 26, and a USB interface 27.

The control unit 21 is implemented by a microcomputer chip in which a CPU, a ROM, a RAM and I/O units are embedded, and performs centralized control for the components in the PC 20 based on programs stored in the ROM or OS and applications loaded onto the RAM.

The display 22 is, for example, an LCD or an organic electroluminescence display, and is configured to display various types of information to be informed to users. The keyboard 23 receives a user operation. The mouse 24 accepts a user operation.

The network interface 25 executes communication based on the Ethernet standard with devices on the LAN 30 (e.g., the PCs 20b and 20c). The storage unit 26 is a non-volatile memory (e.g., a hard disk drive or a flash memory), and stores various types of programs and data. The USB interface 25 executes a communication based on a USB standard with USB devices (e.g., the MFP 10 in this embodiment).

Figure 4:
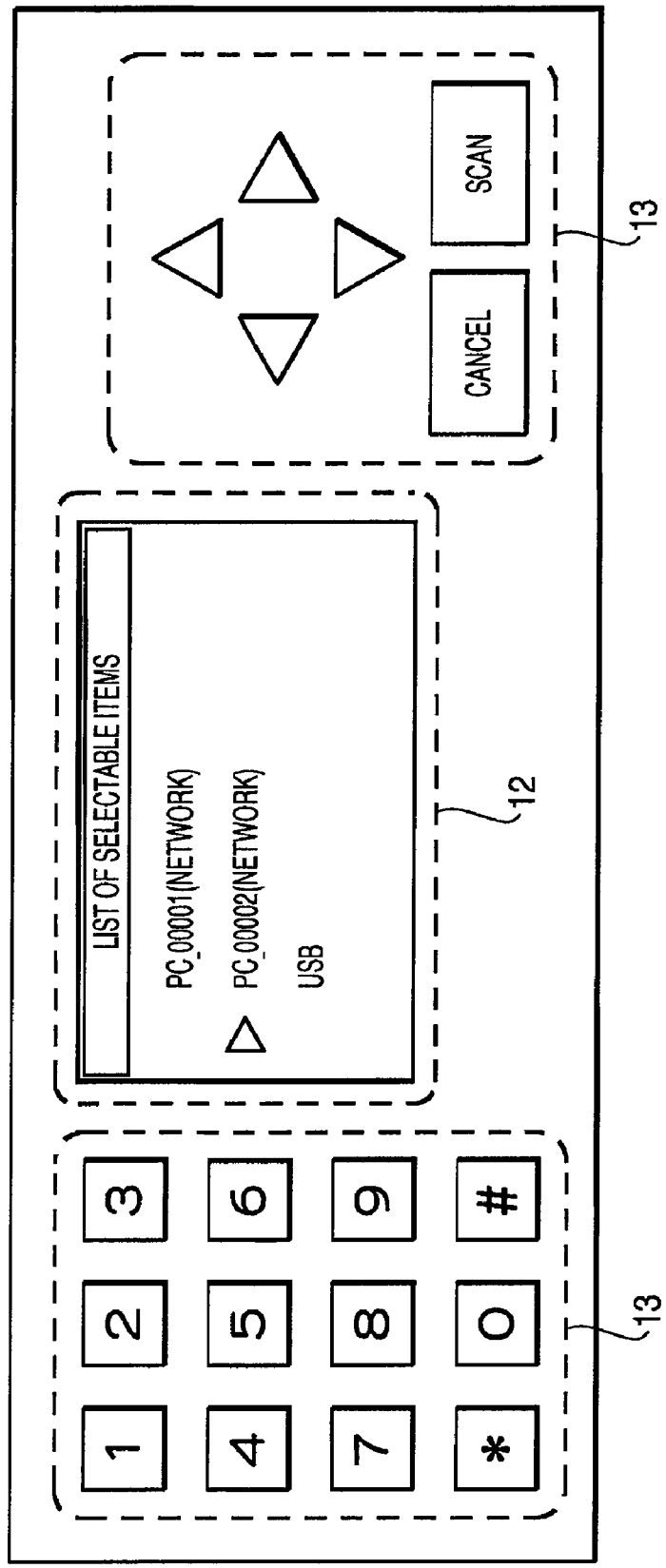
FIG. 4 illustrates an example of an operation panel of the MFP.

Hereafter, a push-scan function performed in the image scanning system 1 is explained with reference to FIGS. 4 and 5. As described in detail below, in the push-scan function, the MFP 10 executes the image scanning and the scanned image data generated on the MFP 10 is transmitted to one of the PCs 20. When the push-scan function is started, each of the PCs 20 is in a state where a user has been logged in.

Push-Scan Via LAN

Figure 3:
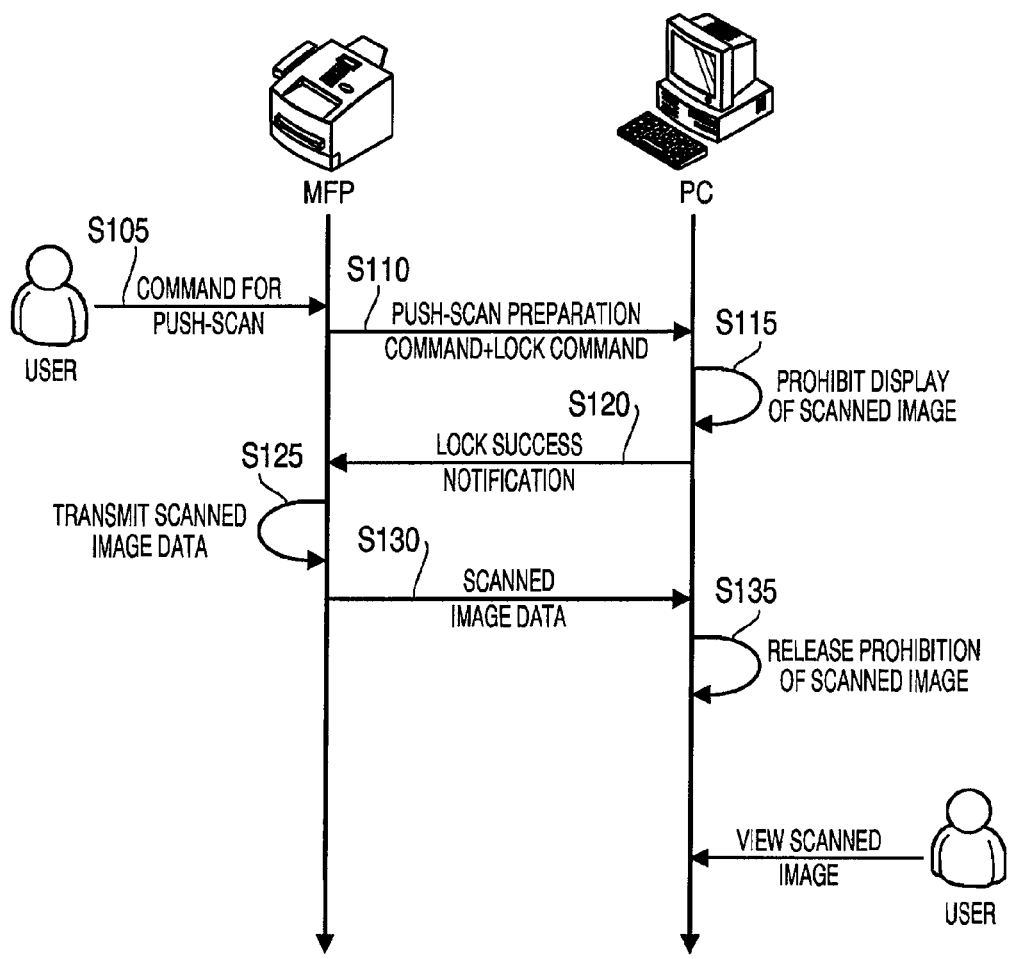
FIG. 3 is a sequence diagram illustrating communication between the MFP and PC when a push-scan function is performed.

First, the push-scan performed via the LAN 30 (i.e., push-scan where scanned image data generated on the MFP 10 is transmitted to the PC 20b or 20c connected to the MFP 10 via the LAN 30) is explained with reference to the sequence diagram shown in FIG. 3.

When a user sets a document on the MFP 10 and then inputs a command for starting the push-scan via an operation panel (step S105), the push-scan is started. As shown in FIG. 4, the operation panel of the MFP 10 includes the LCD panel 12 and the input unit 13. The input unit 13 includes up, down, right and left buttons, a scan button, and a cancellation button. On the LCD panel 12, a selection screen for selecting a transmission target PC to which the scanned image data should be transmitted is displayed. More specifically, on the LCD panel 12, character strings "PC_00001(NETWORK)", "PC_00002(NETWORK)" and "USB" respectively corresponding to the PC 20b, PC 20c and PC 20a are displayed. Through the selection screen, the user is allowed to select one of the displayed items by using the up and down buttons of the input unit 13. When the scan button is pressed in a state where one of "PC_00001(NETWORK)" and "PC_00002(NETWORK)" is selected, the push-scan via LAN in which the selected PC is defined as a transmission target is started.

When the MFP 10 receives a command for stating the push-scan, the MFP 10 starts the push-scan and transmits a push-scan preparation command for starting preparation for the push-scan and a lock command for locking display of a scanned image provided by the push-scan, to the selected PC 20 (step S110). In FIG. 5, a command message 200 representing the push-scan preparation command and the lock command is illustrated. The command message 200 includes a command 201 for instructing preparation for the push-scan, a sub-command 202 for prohibiting display of a scanned image, an MFP IP 203 specifying an IP address of the MFP 10 which generates the scanned image data, and an MFP PORT 204 specifying a port number used by the MFP 10 for communication during execution of the push scan. In step S110, the command message 200 is transmitted from the MFP 10 to the selected PC via the LAN 30.

The PC 20b or 20c which has received the push-scan preparation command and the lock command starts an application for the push-scan, and locks display of a scanned image in accordance with the lock command (step S115). In this case, the PC 20b or 20c may move the OS to a log-off state while keeping the application in a running state, or may cause the application to prohibit displaying of a scanned image. Furthermore, when the locking of display of the scanned image has succeeded, the PC 20b or 20c transmits a lock success notification to the MFP 10 (step S120). In FIG. 5, a notification message 210 to be transmitted from the PC 20b or 20c to the MFP 10 as the lock success notification is illustrated.

When the scan is finished and the MFP 10 receives the lock success notification from the PC 20b or 20c, the MFP 10 starts to transmit the scanned image data to the PC 20b or 20c via the LAN 30.

When a lock release condition is satisfied after receipt of the scanned image data, the PC 20b or 20c releases the locked state of locking display of the scanned image (step S135). Then, the PC 20b or 20c displays the scan image which is generated based on the received scanned image data, on the display 22. The lock release condition may be a condition which is satisfied when a user who has logged in at the beginning of the push-scan and has logged off from the OS to lock display of the scanned image logs in again. Alternatively or additionally, the lock release condition may be a condition which is satisfied when a predetermined time period has elapsed from the locking of display of the scanned image or a condition which is satisfied when a predetermined password is inputted by the user in the case where display of the scanned image is locked by the application.

Push-Scan Via USB

Hereafter, the push-scan where the scanned image data generated on the MFP 10 is transmitted to the PC 20a via the USB 40 is explained.

When a user sets a document on the MFP 10 and then inputs a command for starting the push-scan via the operation panel, the push-scan is started. As shown in FIG. 4, on the LCD panel 12, character strings "PC_00001(NETWORK)", "PC_00002(NETWORK)" and "USB" respectively corresponding to the PC 20b, PC 20c and PC 20a are displayed. Through the selection screen, the user is allowed to select one of the displayed items by using the up and down buttons of the input unit 13. When the scan button is pressed in a state where "USB" is selected, the push-scan via USB in which the PC 20a connected via the USB 40 is defined as a transmission target is started.

When the MFP 10 receives a command for stating the push-scan, the MFP 10 starts the push-scan and transmits a push-scan preparation command for starting preparation for the push-scan, to the PC 20a. In this case, a command message 220 shown in FIG. 5 is transmitted from the MFP 10 to the PC 20a via the USB 40. Then, the MFP 10 generates the scanned image data, and starts to transmit the scanned image data to the PC 20a.

The PC 20a which has received the push-scan preparation command starts an application for executing the push-scan. When the PC 20a starts to receive the scanned image data from the MFP 10, the PC 20a generates a scanned image based on the received scanned image data, and displays the scanned image on the display 22.

Figure 6:
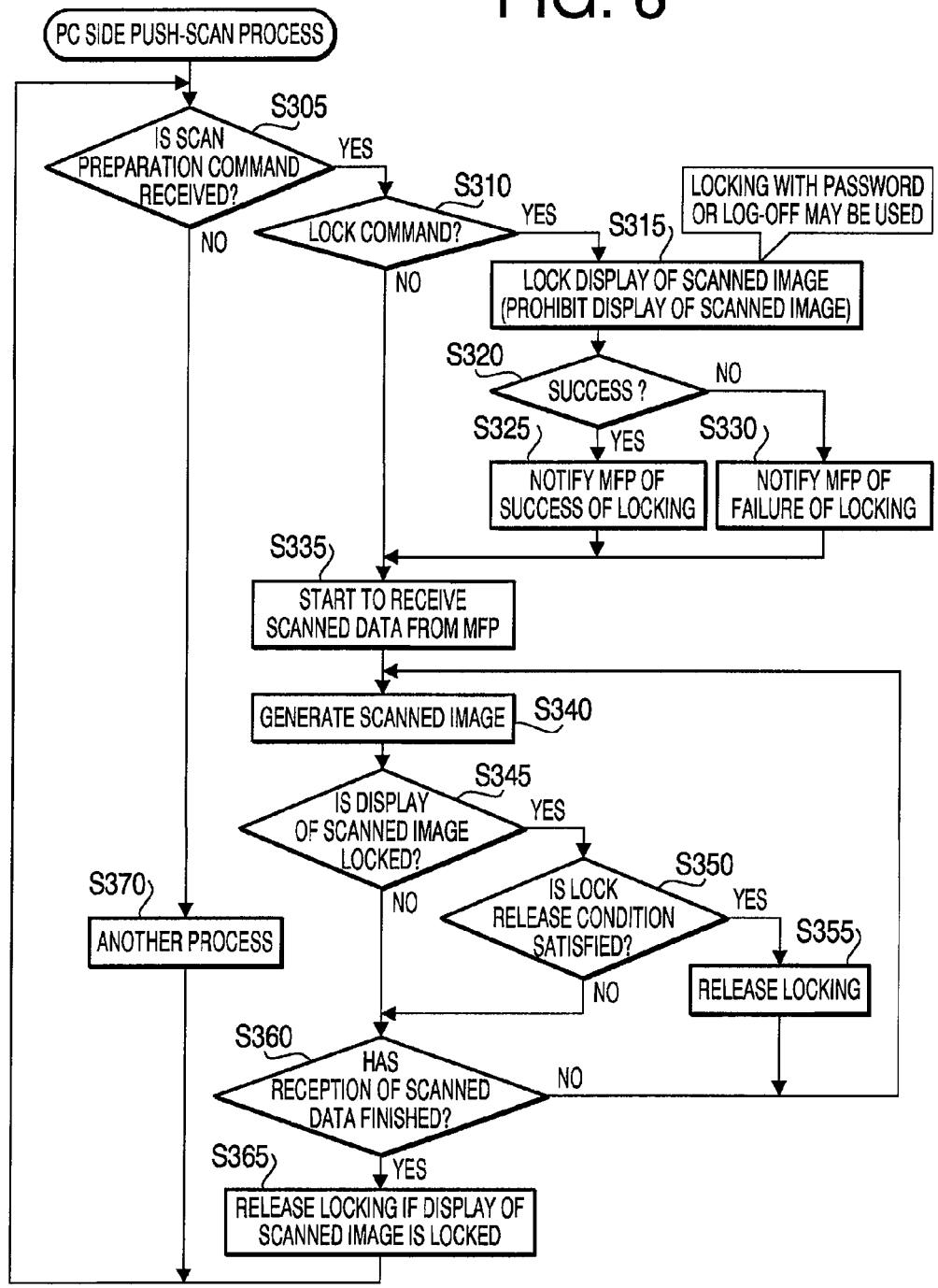
FIG. 6 is a flowchart illustrating a PC side push-scan process to be executed on the PC.

Hereafter, a PC side push-scan process to be executed under control of the control unit 21 of the PC is explained in detail with reference to FIG. 6. The process shown in FIG. 6 is started at the startup of the PC 20, and is terminated when an operation for suspending the PC 20 is conducted.

In step 305, the control unit 21 of the PC 20 judges whether the push-scan preparation command has been received from the MFP 10 through the LAN 30 or the USB 40. When the push-scan preparation command has not been received (S305: NO), control proceeds to step S370. When the push-scan preparation command has been received (S305: YES), the control unit 21 starts the application for the push-scan. Then, control proceeds to step S310.

In step S310, the control unit 21 judges whether the lock command has been received together with the push-scan preparation command. When the lock command is received with the push-scan preparation command (i.e., when the push-scan preparation command is received from the MFP 10 via the LAN 30) (S310: YES), control proceeds to step S315. When the lock command is not received with the push-scan preparation command (i.e., when the push-scan preparation command is received from the MFP 10 via the USB 40) (S310: NO), control proceeds to step S335.

In step S315, the control unit 21 locks display of the scanned image. In this case, the control unit 21 may move the OS to a log-off state while keeping the application for push-scan in a running state. Alternatively, the control unit 21 may cause the application to prohibit display of the entire scanned image, or may cause the application to prohibit display of a major part or a part of the scanned image such that a person hard to recognize the total picture of the scanned image. When the locking has succeeded (S320: YES), the control unit 21 transmits a lock success notification to the MFP 10 via the LAN 30 (step S325). Then, control proceeds to step S335. When the locking has failed (S320: NO), the control unit 21 transmits a lock failure notification to the MFP 10 via the LAN 30 (step S330). Then, control proceeds to step S335.

In step S335, the control unit 21 of the PC 20 starts to receive the scanned image data from the MFP 10 via the LAN 30 or the USB 40.

In step S340, the control unit 21 generates a scanned image based on the received scanned image data. There is a case where the MFP 10 transmits the scanned image data in an encrypted format to the PC 20. In this case, the control unit 21 generates an image in accordance with the encrypted scanned image data. That is, in this case, the control unit 21 generates the scanned image (e.g., a scanned image in a scrambled state) which is different from an original scanned image. Then, the control unit 21 judges whether display of the scanned image is locked (step S345). When display of the scanned image is not locked (S345: NO), the control unit 21 displays the scanned image on the display 22. Then, control proceeds to step S360. When display of the scanned image is locked (S345: YES), control proceeds to step S350.

In step S350, the control unit 21 judges whether the lock release condition is satisfied. More specifically, in the case where the control unit 21 causes the application for the push-scan to prohibit display of the scanned image, the control unit 21 may judge that the lock release condition is satisfied when a predetermined time period has elapsed from the time when display of the scanned image is locked, or the control unit 21 may judge that the lock release condition is satisfied when a predetermined password is accepted from the user via the keyboard 23. On the other hand, in the case where display of the scanned image is locked by moving the OS to a log-off state, the control unit 21 may judge that the lock release condition is satisfied when the user who has logged in at the start time of the push-scan logs in again. When the lock release condition is satisfied (S350: YES), control proceeds to step S355. When the lock release condition is not satisfied (S350: ON), control proceeds to step S360.

In step S355, the control unit 21 releases the locked state of display of the scanned image. Then, control returns to step S340.

In step S360, the control unit 21 judges whether reception of the scanned image data has finished. When reception of the scanned image data has not finished (S360: NO), control proceeds to step S340. When the reception of the scanned image data has finished (S360: YES), control proceeds to step S365.

In step S365, the control unit 21 releases the locked state of display of the scanned image if display of the scanned image is locked, for example, by causing the application for the push-scan to prohibit display of the scanned image. Then, control returns to step S305.

In step S370 which is processed when the push-scan preparation command has not been received, the control unit 21 executes a process other than the processes for the push-scan. After, step S370 is processed, control returns to step S305.

Figure 7:
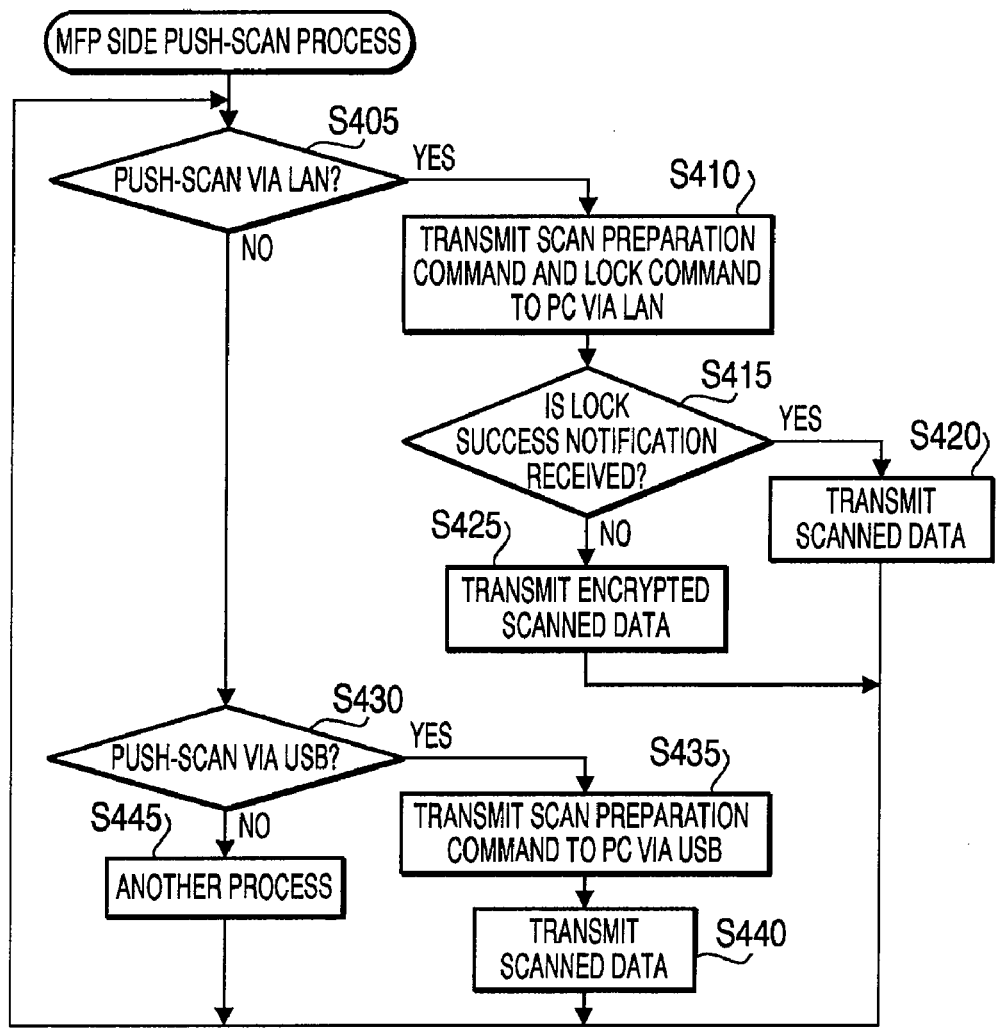
FIG. 7 is a flowchart illustrating an MFP side push-scan process to be executed on the MFP.

Hereafter, an MFP side push-scan process executed under control of the control unit 11 of the MFP 10 is explained with reference to FIG. 7. The MFP side push-scan process is started at the time of startup of the MFP 10, and is terminated when an operation for suspending the MFP 10 is conducted through the input unit 13.

In step S405, the control unit 11 judges whether a start command for the push-scan in which the PC 20*b* or 20*c* connected via the LAN 30 is defined as a transmission target of the scanned image data has been received through the input unit 13. When the start command for the push-scan has been received (S405: YES), the control unit 11 controls the scan engine 14 to start scanning. Then, control proceeds to step S410. When the start command for the push-scan has not been inputted (S405: NO), control proceeds to step S430.

In step S410, the control unit 11 transmits the push-scan preparation command and the lock command to the PC 20*b* or 20*c* via the LAN 30. Then, the control unit 11 judges whether locking of display of the scanned image has succeeded on the PC 20 to which the push-scan preparation command and the lock command have been transmitted (step S415). More specifically, when the control unit 11 receives the lock success notification from the above described PC 20 (S415: YES), the control unit 11 judges that the locking of display of the scanned image has succeeded. Then, control proceeds to step S420. When the control receives the lock failure notification from the above described PC 20 (S415: NO), the control unit judges that the locking of displaying of the scanned image has failed. In this case, control proceeds to step S425.

In step S420 which is processed when the locking of displaying of the scanned image has succeeded, the control unit 11 transmits the scanned image data generated by the scan engine 14 to the PC. After, transmission of the scanned image data is finished, control returns to step S405.

In step S425 which is processed when the locking of display of the scanned image has failed, the control unit 11 encrypts the scanned image data generated by the scan engine 14, and transmits the encrypted scanned image data to the PC. After, transmission of the scanned image data is finished, control returns to step S405.

In step S430 which is processed when the start command for starting the push-scan via the LAN 30 has not been received, the control unit 11 judges whether a start command for the push-scan where the PC 20*a* connected via the USB 40 is defined as a transmission target is received from the user through the input unit 13. When the start command for push-scan via the USB is received (S430: YES), the control unit 11 controls the scan engine 14 to start scanning. Then, control proceeds to step S435. When the start command for the push-scan via the USB has not been received (S430: NO), control proceeds to step S445.

In step S435, the control unit 11 transmits the push-scan preparation command to the PC 20*a* via the USB 40, and transmits the scanned image data generated by the scan engine 14 to the PC 20*a* (step S440). After transmission is finished, control returns to step S405.

In step S445 which is processed when the start command for the push-scan via USB 40 has not been received, the control unit 11 executes another process regarding the push-scan. After step S445 is finished, control returns to step S405.

Hereafter, advantages achieved by the above described embodiment are explained.

In the image scanning system 1, when the push-scan via the LAN 30 is performed, the MFP 10 transmits the lock command to the PC 20*b* or 20*c* (step S110). Then, the PC 20*b* or 20*c* which has received the lock command prohibits display of the scanned image until the lock release condition is satisfied (step S115). Therefore, when the push-scan via the LAN 30 is performed, it becomes possible to prevent the scanned image from being displayed on the PC (20*b* or 20*c*) regardless of whether the user is at the place around the PC (20*b* or 20*c*). Accordingly, the image scanning system 1 is able to prevent an outsider from sneaking a look at the scanned image generated by the push-scan (e.g., a displayed scanned image or a printed scanned image) and thereby to prevent information from leaking to the outsider.

Furthermore, when the PC 20*b* or 20*c* which has received the lock command successfully locks display of the scanned image, the PC 20*b* or 20*c* transmits the lock success command to the MFP 10 (step S120). When the MFP 10 receives the lock success command from the MFP 10, the MFP 10 transmits the scanned image data to the PC 20*b* or 20*c* (step S130). Therefore, the image scanning system 1 is able to reliably prevent an outside from sneaking a look at the scanned image and thereby to prevent the information from leaking to the outsider.

When the PC 20*b* or 20*c* which has received the lock command fails to lock display of the scanned image, the PC 20*b* to 20*c* transmits the lock failure notification to the MFP 10 (step S330). The MFP 10 which has received the lock failure notification encrypts the scanned image data and transmits the encrypted scanned image data to the PC 20*b* or 20*c* (step S425). The PC 20*b* or 20*c* which has received the encrypted scanned image data displays the scanned image in a scrambled state. Such a configuration makes it possible to prevent an outsider from sneaking a look at the image and thereby to prevent information from leaking to the outsider even when the PC 20*b* or 20*c* has failed to lock display of the scanned image.

In the above described embodiment, the operations such as moving the OS in a log-off state are explained as examples of processes for prohibiting display of the scanned image. Such an operation enables the PC to conceal the fact that the push-scan is running on the PC, from an outsider. Therefore, the image scanning system 1 is able to securely prevent an outsider from sneaking a look at the scanned image and to protect the scanned image from theft. Consequently, it becomes possible to prevent information from leaking more reliably.

In the above described embodiment, the condition, where when a predetermined time has elapsed from locking display of the scanned image by prohibiting display of the scanned image through the application for the push-scan, the PC 20 judges that the lock release condition is satisfied, is described as an example of the lock release condition. By using such a condition as a lock release condition, it becomes possible to prohibit display of the scanned image until the user returns to the place around the user's PC 20 even when the user has conducted the user operation for the push-scan at the place away from the user's own PC 20. Consequently, the image scanning system 1 is able to prevent an outside from sneaking a look at the scanned image and thereby to prevent information from leaking to the outsider.

In the above described embodiment, the condition which is satisfied by accepting the predetermined password on the PC 20*b* or 20*c* when the PC 20*b* or 20*c* prohibits display of the scanned image on the application for the push-scan is used as the lock release condition. By using such a condition as the lock release condition, only an authorized user who knows the password is able to view the scanned image on the PC 20*b* or 20*c*. Therefore, the image scanning system 1 is able to prevent an outside from sneaking a look at a scanned image and thereby to prevent information from leaking to the outsider.

It can be assume that if the MFP 10 and the PC 20 are connected to each other via a network (e.g., a LAN), the MFP 10 and the PC 20 are installed at positions away from each other. On the other hand, if the MFP 10 and the PC 20 are directly connected (i.e., if the MFP 10 is locally connected to the PC 20), for example, via an USB, it can be assumed that the MFP 10 and the PC 20 are located closely with respect to each other. If the MFP 10 and the PC 20 are located closely with respect to each other, it can be assumed that the user makes a user operation for the push-scan around the PC 20. It should be noted that, in this specification, when devices are connected directly with respect to each other via a serial cable or a cable based on a standard such as a USB or IEEE1394, such a connection is defined as a local connection. That is, a connected via a network (e.g., a LAN) is not defined as a local connection.

For this reason, when the push-scan is performed via the USB, the MFP 10 transmits only the scan preparation command to the PC 20*a* without transmitting the lock command to the PC 20*a* which is connected thereto via the USB (see step S435). In this case, the scanned image scanned by the push-scan is directly displayed on the PC 20*a* without change.

As described, according to the above described embodiment, when the push-scan via the LAN 30 is executed, the image scanning system 1 assumes that the user is not around the PC 20 and the possibility that that the display of the PC is looked by an outsider arises, and the image scanning system 1 controls the PC 20 to prohibit displaying the scanned image. On the other hand, when the push-scan via the USB 40 is executed, the image scanning system 1 assumes that the user is around the PC 20*a* and controls the PC 20*a* to display the scanned image. Therefore, it becomes possible to prevent an outsider from sneaking a look at the scanned image and thereby to prevent information from leaking to the outsider, while enhancing usability of the image scanning system 1.

Second Embodiment

Hereafter, an image scanning system according to a second embodiment is described. Since the image scanning system according to the second embodiment has the same system configuration as those shown in FIGS. 1 and 2 of the first embodiment, reference symbols shown FIGS. 1 and 2 are also used for the explanation of the second embodiment. In the following, the explanation focuses on the feature of the second embodiment.

Hereafter, a push-scan operation executed on the image scanning system 1 according to the second embodiment is explained. It should be noted that when the push-scan is started, the PC 20 is in a state where the user has logged in. On the PC 20, an application (hereafter, frequently referred to as a push-scan application) has been installed. The push-scan is performed by executing the push-scan application on the PC 20.

Push-Scan Via LAN

First, the push-scan performed via the LAN 30 (i.e., the push-scan where scanned image data generated on the MFP 10 is transmitted to the PC 20*b* or 20*c* connected to the MFP 10 via the LAN 30) is explained.

(a) Release of Prohibition of Displaying Scanned Image by User Operation

The PC 20*b* or 20*c* which has received the lock command from the MFP 10 temporarily prohibits displaying the scanned image. In this section, a process where the PC 20*b* or 20*c* which has temporarily prohibited displaying of the scanned image releases prohibition of displaying of the scanned image in response to receipt of a user operation is explained with reference to FIG. 8.

When a user sets a document on the MFP 10 and then inputs a command for starting the push-scan by selecting one of the PC 20*a* and PC 20*b* through the input unit 13 of the MFP 10 (step S105), the push-scan via LAN 30 where the selected PC 20 is defined as a transmission target is started.

When the MFP 10 receives a command for stating the push-scan, the MFP 10 starts the push-scan and transmits a push-scan preparation command for starting preparation for the push-scan. When the MFP 10 receives a command for prohibition of displaying of the scanned image together with the command for starting the push-scan from the user, the MFP 10 transmits a lock command for locking display of a scanned image provided by the push-scan together with the push-scan preparation command, to the selected PC 20 (step S110).

The PC 20*b* or 20*c* which has received the push-scan preparation command and the lock command starts the push-scan application, and locks display of a scanned image in accordance with the lock command (step S115). It should be noted that when the push-scan application has accepted setting (hereafter, frequently referred to as lock setting) for prohibiting the scanned image from the user, the push-scan application locks displaying of the scanned image regardless of whether the lock command is received. In order to lock displaying of the scanned image, the PC 20*b* or 20*c* may moves the OS to a log-off state while keeping the push-scan application at a running state, or may control the push-scan application to prohibit displaying of the scanned image. When the locking of display of the scanned image has succeeded, the PC 20*b* or 20*c* transmits a lock success notification to the MFP 10 (step S120).

When the scan is finished and the MFP 10 receives the lock success notification from the PC 20*b* or 20*c*, the MFP 10 starts to transmit the scanned image data to the PC 20*b* or 20*c* via the LAN 30 (steps S125 and S130).

When the PC 20*b* or 20*c* receives a command for releasing the locking of display of the scanned image (step S135), the PC 20*b* or 20*c* releases the locking of display of the scanned image (step S140). After, the locking is released, the PC 20*b* or 20*c* displays the scan image which is generated based on the received scanned image data, on the display 22. When the PC 20*b* or 20*c* locks displaying of the scanned image by moving the OS to a log-off state, the PC 20*b* or 20*c* may release the locking of display of the scanned image in response to acceptance of re-log in of the user who has logged in at the time of start of the push-scan, for example. Alternatively, when displaying of the scanned image has been locked through the push-scan application, the PC 20*b* or 20*c* may release the locking of displaying of the scanned image in response to acceptance of a predetermined password through the push-scan application.

(b) Release of Prohibition of Displaying Scanned Image by Timeout

Hereafter, a process where the PC 20b or 20c which has prohibited displaying of the scanned image in response reception of the lock command releases the locking of displaying of the scanned image when a predetermined time period has elapsed after the tome of prohibition of displaying of the scanned image is explained with reference to the sequence diagram shown in FIG. 9.

Figure 8:
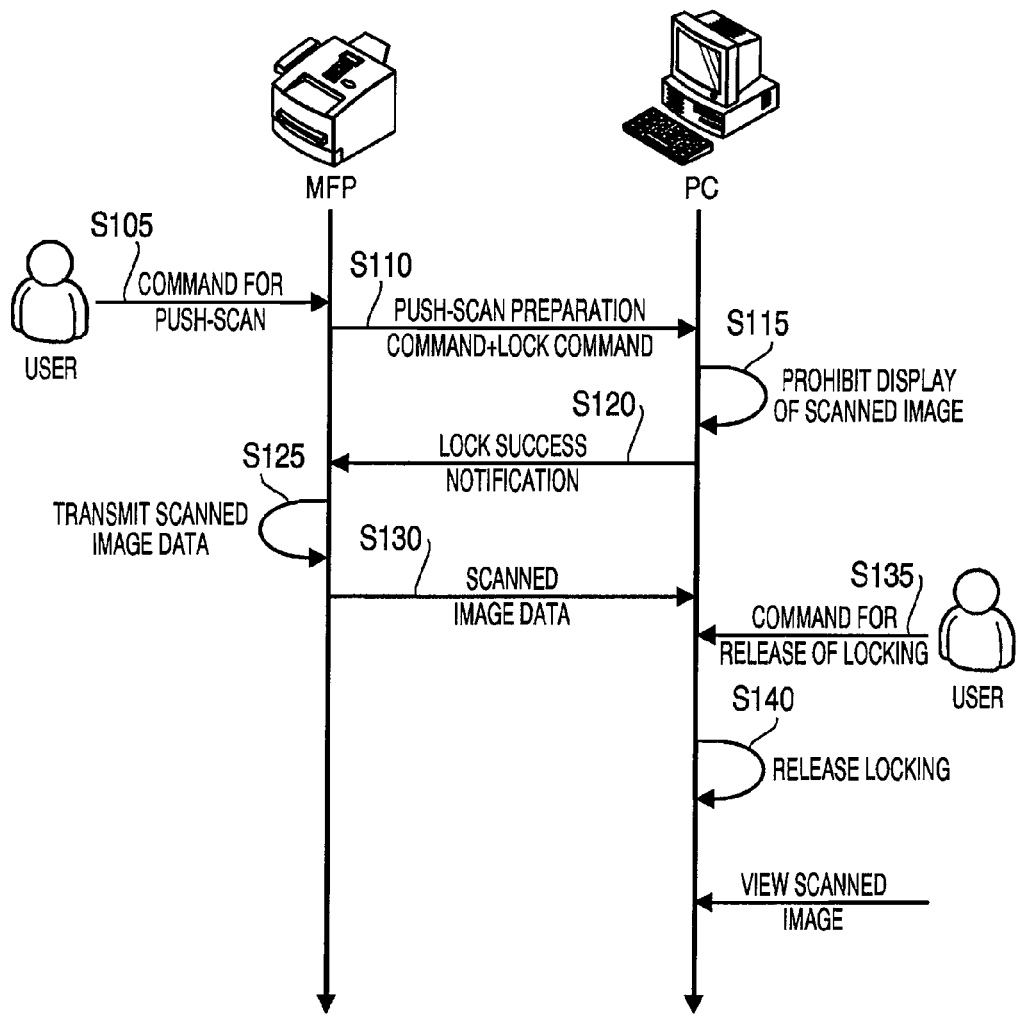
FIG. 8 is a sequence diagram illustrating communication between the MFP and the PC when prohibition of displaying of a scanned image during the push-scan is released by a user operation.
Figure 9:
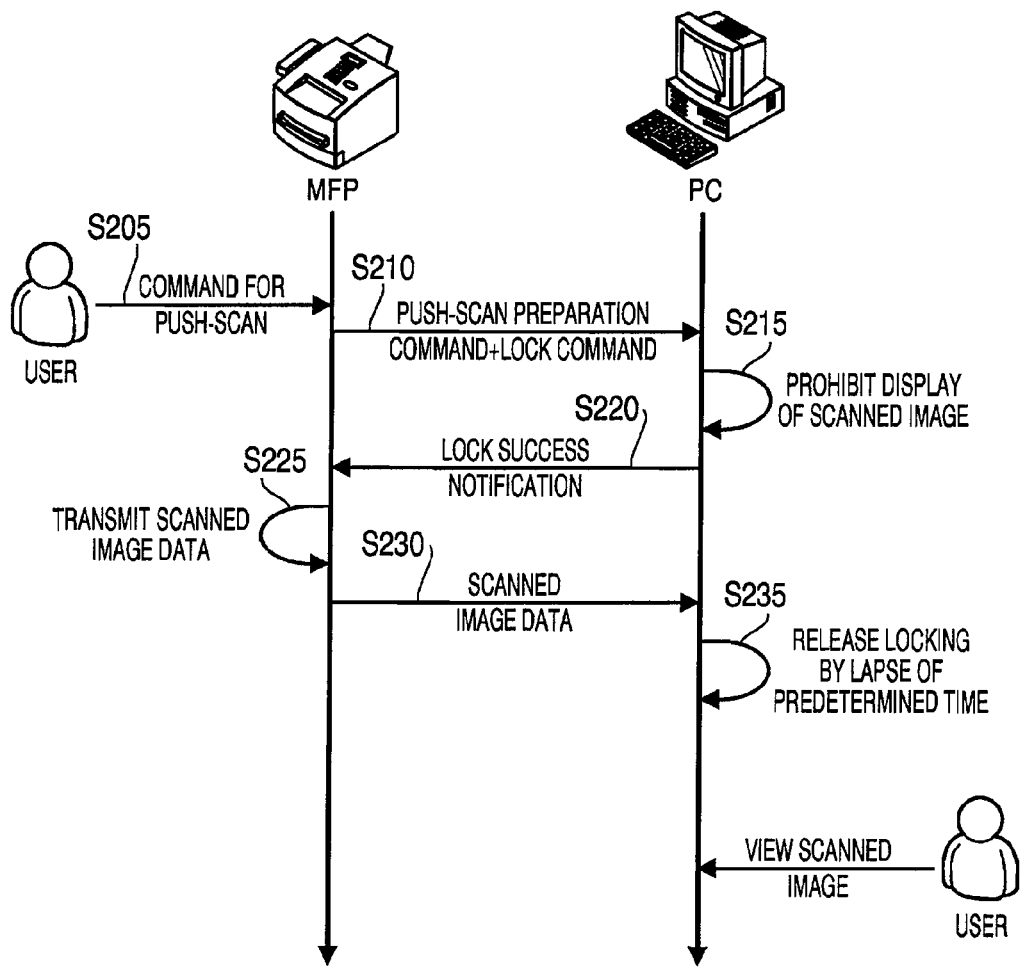
FIG. 9 is a sequence diagram illustrating communication between the MFP and the PC when prohibition of displaying of a scanned image during the push-scan is released by a timeout.

In steps S205 and 5210 in FIG. 9, the same processes as those of steps S105 and S110 in FIG. 8 are executed. The PC 20b or 20c which has received the push-scan preparation command and the lock command from the MFP 10 starts the push-scan application, and locks displaying of the scanned image in accordance with the lock command (step S215). It should be noted that when the lock setting has been inputted (i.e., the lock setting has been established), the PC 20b or 20c locks displaying of the scanned image regardless of whether the lock command is received. Furthermore, when the PC 20b or 20c locks displaying of the scanned image, the PC 20b or 20c may prohibit displaying of the scanned image through the push-scan application. When the PC 20b or 20c has locked displaying of the scanned image successfully, the PC 20b or 20c transmits the lock success notification to the MFP 10 (step S220).

After the scanning is finished and the MFP 10 receives the lock success notification from the PC 20b or 20c, the MFP 10 starts to transmit the scanned image data to the PC 20b or 20c via the LAN 30 (steps S225 and S230).

When the predetermined time period has elapsed from the tome of locking of display of the scanned image, the PC 20b or 20c releases the locking of display of the scanned image (step S235). When the locking of display of the scanned image is released, the push-scan application displays an image generated based on the received scan image data on the display 22.

Push-Scan Via USB

Hereafter, the push-scan where the scanned image data generated on the MFP 10 is transmitted to the PC 20a via the USB 40 is explained.

When a user sets a document on the MFP 10, selects the PC 20a and inputs a command for starting the push-scan via the input unit 13, the push-scan where the scanned image data is transmitted to the PC 20a defined as a transmission target is started.

When the MFP 10 receives the command for stating the push-scan, the MFP 10 starts the push-scan and transmits a push-scan preparation command for starting preparation for the push-scan, to the PC 20a. Then, the MFP 10 generates the scanned image data, and starts to transmit the scanned image data to the PC 20a.

The PC 20a which has received the push-scan preparation command starts the push-scan application. When the PC 20a starts to receive the scanned image data from the MFP 10, the PC 20a generates a scanned image based on the received scanned image data, and displays the scanned image on the display 22.

Figure 10:
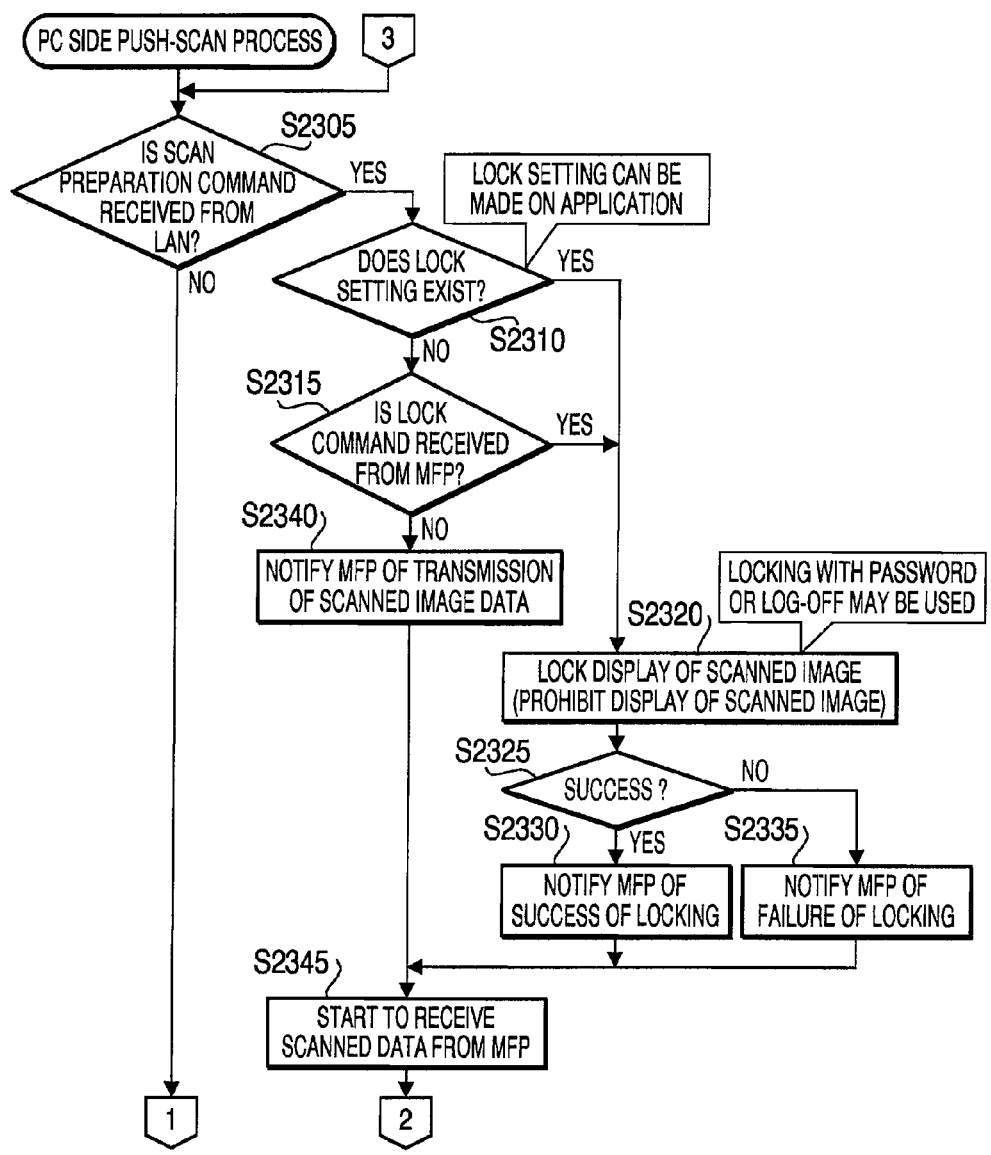
FIGS. 10 and 11 illustrate a flowchart of a PC side push-scan process according to a second embodiment.
Figure 11:
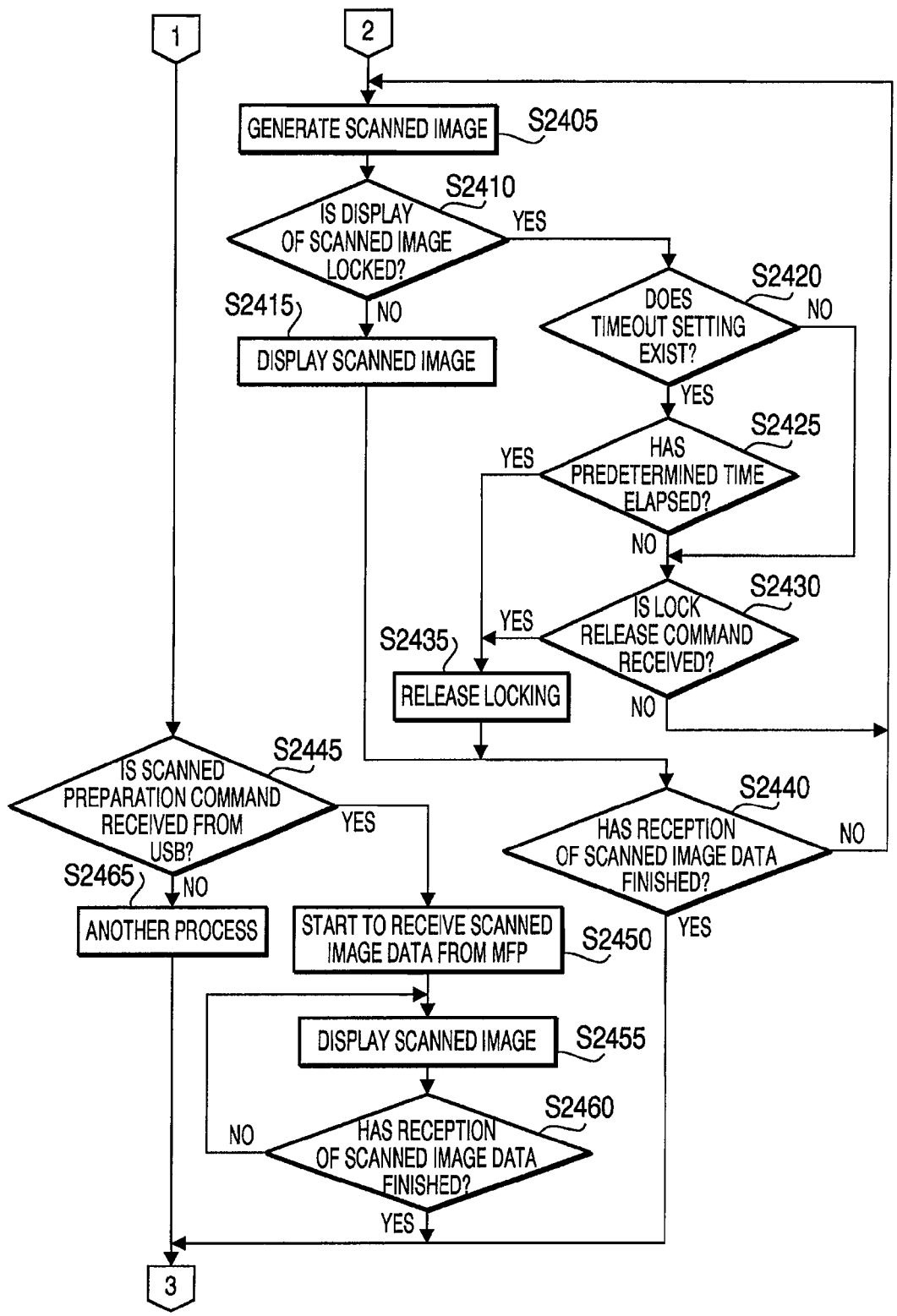

Hereafter, a PC side push-scan process executed on the PC 20 according to the second embodiment is explained with reference to FIGS. 10 and 11. The PC side push-scan process is executed under control of the control unit 21 of the PC 20. The PC side push-scan process is started at the time of startup of the PC 20, and is terminated when an operation for suspending the PC 20 is conducted.

In step S2305, the control unit 21 of the PC 20 judges whether the push-scan preparation command has been received from the MFP 10 via the LAN 30. When the push-scan preparation command has not been received (S2305: NO), control proceeds to step S2445 shown in FIG. 11. When the control unit 21 has received the push-scan preparation command (S2305: YES), the control unit 21 starts the push-scan application. Then, control proceeds to step S2310. By executing the push-scan application, the control unit 21 executes steps concerning the push-scan.

In step S2310, the control unit 21 judges whether the lock setting has been inputted based on the information stored in the storage unit 26. As described above, before the start of the push-scan, the user is allowed to store the information of the lock setting indicating whether to prohibit displaying of the scanned image corresponding to the scanned image data transmitted from the MFP 10 during the push-scan, by operating the push-scan application. When the lock setting has been inputted (i.e., the lock setting has been established) (S2310: YES), control proceeds to step S320. On the other hand, when the lock setting has not been inputted (S2310: NO), control proceeds to step S315.

In step S2315, the control unit 21 judges whether the control unit 21 has received the lock command from the MFP 10 together with the push-scan preparation command. When the lock command has been received (S2315: YES), control proceeds to step S2320. When the lock command has not been received (S2315: NO), control proceeds to step S2340.

In step S2320, the control unit 21 locks displaying of the scanned image. More specifically, in this case, the control unit 21 may move the OS running on the PC 20 to a log-off while keeping the push-scan application in a running state. Alternatively, the control unit 21 may instruct the push-scan application to prohibit displaying of the entire scanned image or to prohibit displaying a major part or a part of the scanned image. When the locking of display of the scanned image has succeeded (S2325: YES), the control unit 21 transmits the lock success notification to the MFP 10 via the LAN 30 (step S2330). Then, control proceeds to step S2345. When the locking of display of the scanned image has failed (S2325: NO), the control unit 21 transmits the lock failure notification to the MFP 10 via the LAN 30 (step S2335). Then, control proceeds to step S2345.

In step S2340 which is processed when the lock command has not been received from the MFP 10, the control unit 21 transmits a command (hereafter, frequently referred to as a transmission start notification) for starting transmission of the scanned image data via the LAN 30, to the MFP 10. Then, control proceeds to step S2345.

In step S2345, the control unit 21 starts to receive the scanned image data from the MFP 10 via the LAN 30. Then, control proceeds to step S2405 in FIG. 11.

In step S2405, the control unit 21 generates the scanned image based on the scanned image data which has been received. It should be noted when the scanned image data in an encrypted form is received, the control unit 21 generates an image based on the scanned image data in an encrypted form. That is, in this case, the control unit 21 generates an image (e.g., a scanned image in a scrambled form) which is different from an original scanned image.

Then, the control unit 21 judges whether displaying of the scanned image is locked (step S2410). When displaying of the scanned image is not locked (S2410: NO), the control unit 21 displays the scanned image generated through the push-scan application, on the display 22 (step S2415). Then, control proceeds to step S2440. When displaying of the scanned image is locked (S2410; YES), control proceeds to step S2420.

In step S2420, control branches depending on whether a condition based on the lapse of time from the locking by the push-scan application has been set as a condition for releasing the locking of displaying of the scanned image. When the condition based on the lapse of time has been set (S2420: YES), control proceeds to step S2425. When the condition based on the lapse of time has not been set (S2420: NO), control proceeds to step S2430.

In step S2425, the control unit 21 judges whether a predetermined time period has elapsed from the time when the push-scan application has locked displaying of the scanned image. When the control unit 21 judges that the predetermined time period has elapsed from the locking of displaying of the scanned image (S2425: YES), control proceeds to step S2435. When the control unit 21 judges that the predetermined time period has not elapsed from the locking of displaying of the scanned image (S2425: NO), control proceeds to step S2430.

In step S2430, the control unit 21 judges whether a lock release command has been received from the user. More specifically, when the control unit 21 has instructed the push-scan application to prohibit displaying of the scanned image, the control unit 21 may judge that the lock release command has been received from the user in response to acceptance of a predetermined password from the user via the keyboard 23. On the other hand, when the control unit 21 has locked displaying of the scanned image by moving the OS to a log-off state, the control unit 21 may judge that the lock release command is received in response to re-logging in by the user who has logged in at the time of start of the push-scan.

When the control unit 21 judges that the lock release command has been received (S2430: YES), control proceeds to step S2435. When the control unit 21 judges that the lock release command has not been received (S2430: NO), control returns to step S2405.

In step S2435, the control unit 21 releases the locking of displaying of the scanned image. Then, control proceeds to step S2440.

In step S2440, the control unit 21 judges whether reception of the scanned image data from the MFP 10 is finished. When the reception of the scanned mage data is not finished (S2440: NO), control returns to step S2405. When reception of the scanned image data is finished (S2440: YES), control returns to step S2305 in FIG. 10.

In step S2445, the control unit 21 judges whether the push-scan preparation command has been received from the MFP 10 via the USB 40. When the push-scan command has not been received (S2445: NO), control proceeds to step S 2465. When the push-scan command has been received (S2445: YES), the control unit 21 starts the push-scan application. Then, control proceeds to step S2450. It should be noted that the control unit 21 processes steps concerning the push-scan via the USB 40 by executing the push-scan application.

In step S2450, the control unit 21 starts to receive the scanned image data from the MFP 10 via the USB 40. Then, control proceeds to step S2445. In step S2445, the control unit 21 generates the scanned image based on the scanned image data which has been received, and displays the scanned image generated by the push-scan application on the display 22. Then, control proceeds to step S2460.

In step S2460, the control unit 21 judges whether reception of the scanned image data from the MFP 10 is finished. When reception of the scanned image data is not finished (S2460: NO), control returns to step S2445. When reception of the scanned image data is finished (S2460: YES), control returns to step S2305 in FIG. 10.

In step S2465 which is processed when the push-scan preparation command has not been received, the control unit 21 executes a process other than the processes concerning the push-scan. After step S2465 is finished, control returns to step S2305.

Hereafter, an MFP side push-scan process executed under control of the control unit 11 of the MFP 10 is explained. Since the flowchart of the MFP side push-scan process according to the second embodiment is substantially the same as that of the first embodiment shown in FIG. 7. The MFP side push-scan process is explained hereafter with reference to FIG. 7. The MFP side push-scan process is started at the time of startup of the MFP 10, and is terminated when an operation for suspending the MFP 10 is conducted through the input unit 13.

In step S405, the control unit 11 judges whether a start command for the push-scan in which the PC 20b or 20c connected via the LAN 30 is defined as a transmission target of the scanned image data has been received through the input unit 13. When the start command for the push-scan has been accepted (S405: YES), the control unit 11 controls the scan engine 14 to start scanning. Then, control proceeds to step S410. When the start command for the push-scan has not been inputted (S405: NO), control proceeds to step S430.

In step S410, the control unit 11 transmits the push-scan preparation command and the lock command to the PC 20b or 20c via the LAN 30. Then, control proceeds to step S415. In this case, the MFP 10 may receive a user command for the lock command together with the start command for the push-scan from the user. In this case, the control unit 11 may transmit the lock command only when the user command for the lock command is received together with the start command for the push-scan. When the control unit 11 does not transmit the lock command, the judgment result in step S2315 of the PC side push-scan process becomes "NO". When the control unit 11 transmits the lock command, the judgment result in step S2315 of the PC side push-scan process becomes "YES".

In step S415, the control unit 11 judges whether locking of display of the scanned image has succeeded on the PC 20 to which the push-scan preparation command and the lock command have been transmitted. More specifically, when the control unit 11 receives the lock success notification from the above described PC 20 (S415: YES), the control unit 11 judges that the locking of display of the scanned image has succeeded. Then, control proceeds to step S420. When the control unit 11 receives the lock failure notification or the transmission start notification from the above described PC 20 or the control unit 11 receives no notification from the above described PC 20, the control unit 11 judges that the locking of displaying of the scanned image has failed (step S415: NO). In this case, control proceeds to step S425.

In step S420 which is processed when the locking of displaying of the scanned image has succeeded, the control unit 11 transmits the scanned image data generated by the scan engine 14 to the PC. After, transmission of the scanned image data is finished, control returns to step S405.

In step S425 which is processed when the locking of display of the scanned image has failed, the control unit 11 encrypts the scanned image data generated by the scan engine 14, and transmits the encrypted scanned image data to the PC. After, transmission of the scanned image data is finished, control returns to step S405.

In step S430 which is processed when the push-scan via the LAN 30 has not been received, the control unit 11 judges whether a start command for the push-scan where the PC 20a connected via the USB 40 is defined as a transmission target is received from the user through the input unit 13. When the above described start command is received (S430: YES), the control unit 11 controls the scan engine 14 to start scanning. Then, control proceeds to step S435. When the above described stat command for the push-scan has not been received (S430: NO), control proceeds to step S445.

In step S435, the control unit 11 transmits the push-scan preparation command to the PC 20*a* via the USB 40, and transmits the scanned image data generated by the scan engine 14 to the PC 20*a* (step S440). After transmission is finished, control returns to step S405.

In step S445 which is processed when the start command for the push-scan via USB 40 has not been received, the control unit 11 executes another process regarding the push-scan. After step S445 is finished, control returns to step S405.

Hereafter, advantages achieved by the second embodiment are described. It should be noted that the second embodiment is able to achieve the same advantages as those achieved by the first embodiment.

Through the push-scan application installed on the PC 20, the user is able to set locking of the scanned image generated during execution of the push-scan. Further, when the push-scan via the LAN 30 is started in the state where the lock setting has been inputted, the PC 20*b* or 20*c* prohibits displaying of the scanned image until a predetermined condition is satisfied (step S2320). Therefore, when the lock setting has been inputted, it becomes possible to prevent the scanned image from being directly displayed on the PC 20*b* or 20*c* regardless of whether the user is around the PC 20*b* or 20*c*. Consequently, it becomes possible to prevent an outsider from sneaking a look at the scanned image scanned from a document, and thereby to prevent information from leaking.

When the PC 20*b* or 20*c* receives the lock command from the MFP 10 during the push-scan via the LAN 30, the PC 20*b* or 20*c* prohibits displaying of the scanned image until a predetermined condition is satisfied (S2320). Therefore, the user is able to input a command for locking displaying of the scanned image during the push-scan, to the PC 20*b* or 20*c*. Therefore, it is possible to prohibit displaying of the scanned image even when the lock setting has not been established on the PC 20*b* or 20*c*. Consequently, it becomes possible to prevent an outsider from sneaking a look at the scanned image scanned from a document, and thereby to prevent information from leaking.

In the above described embodiment, the operations such as moving the OS to a log-off state are explained as examples of processes for prohibiting display of the scanned image. Such an operation enables the PC to conceal the fact that the push-scan is running on the PC, from an outsider. Therefore, the image scanning system 1 is able to securely prevent an outsider from sneaking a look at the scanned image and to protect the scanned image from theft. Consequently, it becomes possible to prevent information from leaking more reliably.

The PC 20*b* or 20*c* releases the locking when the predetermined time period has elapsed from the time of locking of display of the scanned image (S2425). Therefore, when the user works for the push-scan at the place away from the PC 20*b*, the PC 20*b* or 20*c* is able to prohibit displaying of the scanned image from the time of start of the push-scan to the time when the user returns to the place around the PC 20*b* or 20*c*. Consequently, it becomes possible to prevent an outsider from sneaking a look at the scanned image scanned from a document, and thereby to prevent information from leaking.

The PC 20*b* or 20*c* releases the locking of displaying of the scanned image when the PC 20*b* or 20*c* accepts the predetermined password. When displaying of the scanned image is locked by moving the OS to a log-off state, the PC 20*b* or 20*c* releases the locking in response to re-logging in by the user who has logged in at the time of start of the push-scan. Such a configuration makes it possible to enable only the authorized user who knows the predetermined password to release the locking. Consequently, it becomes possible to prevent an outsider from sneaking a look at the scanned image scanned from a document, and thereby to prevent information from leaking.

It can be assume that if the MFP 10 and the PC 20 are connected to each other, for example, via a LAN, the MFP 10 and the PC 20 are installed at positions away from each other. On the other hand, if the MFP 10 and the PC 20 are directly connected, for example, via an USB, it can be assumed that the MFP 10 and the PC 20 are located closely with respect to each other. If the MFP 10 and the PC 20 are located closely with respect to each other, it can be assumed that the user makes a user operation for the push-scan around the PC 20.

For this reason, when the push-scan is performed via the USB, the MFP 10 transmits only the scan preparation command to the PC 20*a* without transmitting the lock command to the PC 20*a* which is connected thereto via the USB (see step S435). In this case, the scanned image scanned by the push-scan is directly displayed on the PC 20*a* without change.

As described, according to the above described embodiment, when the push-scan via the LAN 30 is executed, the image scanning system 1 assumes that the user is not around the PC 20 and the possibility that that the display of the PC is looked by an outsider arises, and the image scanning system 1 controls the PC 20 to prohibit displaying the scanned image. On the other hand, when the push-scan via the USB 40 is executed, the image scanning system 1 assumes that the user is around the PC 20*a* and controls the PC 20*a* to display the scanned image. Therefore, it becomes possible to prevent an outsider from sneaking a look at the scanned image and thereby to prevent information from leaking to the outsider, while enhancing usability of the image scanning system 1.

Although the present invention has been described in considerable detail with reference to certain preferred embodiments thereof, other embodiments are possible.

(1) In the above described embodiment, when the PC 20*b* or 20*c* receives the encrypted scanned image data from the MFP 10 via the LAN 30, the PC 20*b* or 20*c* displays, on the display 22, an image different from an original scanned image based on the encrypted scanned image data. However, when the PC 20*b* or 20*b* receives encrypted scanned image data, the PC 20*b* or 20*c* may generate and display a particular image (e.g., a black image) in place of displaying the image corresponding to the encrypted image data. It is understood that the same advantages achieved by the above described embodiment can be obtained even when such a particular image is displayed in place of displaying the image corresponding to the encrypted scanned image data.

(2) In the case where the PC 20*b* or 20*c* receives the encrypted scanned image data from the MFP 10 and displays the particular image different from the original scanned image, the PC 20*b* or 20*c* may decode the encrypted scanned image data when a predetermined password is accepted from the user via the keyboard 23. In this case, the PC 20*b* or 20*c* may display the original scanned image on the display 22. Such a configuration makes it possible to allow only an authorized user who knows the predetermined password to view the scanned image, and thereby to prevent an outsider from sneaking a look at the scanned image.

(3) In the above described embodiment, the MFP 10 and the PC 20*a* are connected to each other via a USB, the MFP 10 and the PC 20*a* may be connected to each other through another bus standard such as an IEEE 1394. It is understood that the same advantages as those achieved by the above described embodiment can also be obtained even when the MFP 10 and the PC 20a is connected to each other through another bus standard.

(4) In the above described embodiment, the push-scan function is implemented on a multifunction peripheral. However, the push-scan function may be implemented on a scanner device specifically designed to execute image scanning.

What is claimed is:

1. An image scanning system, comprising:
   an image scanner configured to scan an image in accordance with a command directly inputted by a user and to generate image data based on the scanned image; and
   an information processing device configured to generate a display of an image corresponding to the image data generated by the image scanner,
   the image scanner comprising:
      a processor; and
      memory storing computer readable instructions that, when executed, cause the image scanner to provide:
         an output unit configured to output the image data generated based on the scanned image to the information processing device; and
         an instructing unit configured to transmit a prohibition command for prohibiting displaying of an image based on the image data outputted by the output unit, to the information processing device;
   the information processing device comprising:
      a processor; and
      memory storing computer readable instructions that, when executed, cause the information processing device to provide:
         a data reception unit configured to receive the image data outputted by the image scanner;
         a display unit configured to display various types of images;
         a control unit configured to control the display unit to display the image based on the image data received by the data reception unit; and
         a command reception unit configured to receive the prohibition command,
      wherein the control unit is configured to prohibit displaying of the image based on the image data received by the data reception unit in response to reception of the prohibition command through the command reception unit.

2. The image scanning system according to claim 1, wherein:
   the information processing device is further caused to provide a first notification unit configured to transmit a first notification, indicating that displaying of the image based on the image data received by the data reception unit has been prohibited, to the image scanner;
   the image scanner is further caused to provide a first reception unit configured to receive the first notification;
   in response to receipt of the first notification through the first reception unit, the output unit of the image scanner is configured to output the image data to the information processing device that outputted the first notification.

3. The image scanning system according to claim 1, wherein the control unit is configured to prohibit displaying of the image based on the image data received by the data reception unit, in response to reception of the prohibition command through the command reception unit, by moving the information processing device to a log-off state.

4. The image scanning system according to claim 1, wherein the control unit is further configured to release prohibition of displaying of the image based on the image data in response to a lapse of a predetermined amount of time from a time when the control unit has prohibited displaying of the image based on the image data received by the data reception unit.

5. The image scanning system according to claim 1, wherein:
   the information processing device is further caused to provide an input reception unit configured to receive a password from a user;
   the control unit is further configured to release prohibition of displaying of the image based on the image data in response to reception of the password through the input reception unit after the control unit has prohibited displaying of the image based on the image data received by the data reception unit.

6. The image scanning system according to claim 1, wherein:
   the output unit of the image scanner is configured to be able to selectively output the image data to one of the information processing device connected to the image scanner via a network and the information processing device locally connected to the image scanner;
   the instruction unit is configured to transmit the prohibition command to the information processing device connected to the image scanner via the network when the output unit outputs the image data to the information processing device connected to the image scanner via the network; and
   the instruction unit is further configured to not transmit the prohibition command to the information processing device locally connected to the image scanner when the output unit outputs the image data to the information processing device locally connected to the image scanner.

7. The image scanning system according to claim 1, wherein:
   the information processing device is further caused to provide a second notification unit configured to transmit a second notification indicating that prohibition of displaying of the image based on the image data received by the data reception unit has failed, to the image scanner;
   the image scanner is further caused to provide a second reception unit configured to receive the second notification;
   in response to receipt of the second notification through the second reception unit, the output unit of the image scanner is configured to output the image data in an encrypted form to the information processing device which has outputted the second notification.

8. An image scanner, comprising:
   a scanning unit configured to scan an image in accordance with a command directly inputted by a user and to generate image data based on the scanned image; and
   an transmission unit configured to:
      transmit the image data generated based on the scanned image to an information processing device different from the image scanner; and
   transmit a prohibition command, for prohibiting displaying of an image by the information processing device based on the image data transmitted from the image scanner, to the information processing device.

9. The image scanner according to claim 8, wherein the transmission unit is configured to transmit the image data to the information processing device in response to receipt of a notification outputted by the information processing device in response to the prohibition command.

10. The image scanner according to claim 8, wherein:
the transmission unit is configured to be able to selectively output the image data to one of an information processing device connected to the image scanner via a network and an information processing device locally connected to the image scanner;
the transmission unit is configured to transmit the prohibition command to the information processing device connected to the image scanner via the network when the image data is transmitted to the information processing device connected to the image scanner via the network; and
the transmission unit is configured to not transmit the prohibition command to the information processing device locally connected to the image scanner when the image data is transmitted to the information processing device locally connected to the image scanner.

11. The image scanner according to claim 8,
wherein in response to receipt of a notification indicating that prohibition of displaying of the image based on the image data has failed from the information processing device, the transmission unit is configured to transmit the image data in an encrypted form to the information processing device.

12. A non-transitory computer readable medium having computer readable instructions stored thereon, which, when executed by a processor of an information processing device, cause the information processing device to:
judge whether displaying of an image based on image data generated by an image scanner is prohibited;
receive the image data from the image scanner;
display the image based on the received image data;
prohibit displaying of the image based on the received image data when it is judged that displaying of the image based on the image data generated by the image scanner is prohibited;
while displaying of the image is prohibited:
judge whether a predetermined condition is satisfied while displaying of the image is being prohibited; and
release prohibition of displaying of the image based on the image data in response to judging that the predetermined condition is satisfied such that the received image data is allowed to be displayed.

13. The computer readable medium according to claim 12, wherein judging whether the displaying of the image based on the image data generated by the image scanner is prohibited is performed based on information stored in a storage unit of the information processing device.

14. The computer readable medium according to claim 13, wherein execution of the instructions further causes the information processing device to:
receive a prohibition command for prohibiting display of the image based on the image data obtained from the image scanner; and
prohibit display of the image based on the image data in response to reception of the prohibition command.

15. The computer readable medium according to claim 12, wherein prohibiting displaying of the image based on the image data is performed by moving the information processing device to a log-off state.

16. The computer readable medium according to claim 12, wherein:
receiving the image data from the image scanner includes receiving the image data from one of an image scanner connected to the information processing device via a network and an image scanner connected locally to the information processing device; and
judging whether displaying of an image based on image data generated by an image scanner is prohibited includes:
judging that displaying of the image based on the image data is not prohibited if the image data is obtained from the image scanner locally connected to the information processing device; and
judging whether displaying of the image based on the image data is prohibited based on the information stored in the storage unit if the image data is obtained from the image scanner connected to the information processing device via the network.

* * * * *